(12) United States Patent
Rehn et al.

(10) Patent No.: US 9,729,835 B2
(45) Date of Patent: Aug. 8, 2017

(54) METHOD FOR SWITCHING VIEWING MODES IN A CAMERA

(71) Applicant: AXIS AB, Lund (SE)

(72) Inventors: John Rehn, Malmo (SE); Niklas Svensson, Malmo (SE); Andreas Palsson, Malmo (SE)

(73) Assignee: AXIS AB, Lund (SE)

( * ) Notice: Subject to any disclaimer, the term of this patent is extended or adjusted under 35 U.S.C. 154(b) by 374 days.

(21) Appl. No.: 13/835,740

(22) Filed: Mar. 15, 2013

(65) Prior Publication Data

US 2013/0265436 A1 Oct. 10, 2013

Related U.S. Application Data

(60) Provisional application No. 61/623,284, filed on Apr. 12, 2012.

(30) Foreign Application Priority Data

Apr. 4, 2012 (EP) ..................... 12163178

(51) Int. Cl.
G02B 15/10 (2006.01)
H04N 7/18 (2006.01)
(Continued)

(52) U.S. Cl.
CPC .............. H04N 7/181 (2013.01); G02B 13/06 (2013.01); G02B 15/10 (2013.01);
(Continued)

(58) Field of Classification Search
CPC ...... G02B 13/009; G02B 15/10; H04N 5/232; H04N 5/2251; H04N 5/2254;
(Continued)

(56) References Cited

U.S. PATENT DOCUMENTS 6,404,455 B1   6/2002  Ito
7,755,697 B2 * 7/2010  Hsu .............................. 348/347
(Continued)

FOREIGN PATENT DOCUMENTS

CN   10 111 9478 A   2/2008
EP    2 187 622 A1   5/2010
(Continued)

OTHER PUBLICATIONS

EP Communication, EP Application No. 12 163 178.2, Jan. 17, 2017, 5 pages.
(Continued)

Primary Examiner — Jay Patel
Assistant Examiner — Shadan E Haghani
(74) Attorney, Agent, or Firm — Volpe and Koenig, P.C.

(57) ABSTRACT

A method is provided for switching operation of a monitoring system from a first monitoring mode to a second monitoring mode. An overview image is presented when the monitoring system is in a first monitoring mode. A direction signal is received from a control means when the monitoring system is in the first monitoring mode. A camera is directed in an absolute direction indicated by the direction signal in accordance with a first camera control scheme. The monitoring system enters into a second monitoring mode in response to receiving the direction signal presenting a detailed image view captured by the camera when directed in the direction indicated by the direction signal. When in the second monitoring mode, a camera head of the camera is moved in response to control signals from the control means in accordance with a second control scheme.

9 Claims, 6 Drawing Sheets

(51) Int. Cl.
G02B 13/06 (2006.01)
H04N 5/232 (2006.01)

(52) U.S. Cl.
CPC ......... H04N 5/23216 (2013.01); H04N 7/183 (2013.01); H04N 7/188 (2013.01); *H04N 5/23238* (2013.01); *H04N 5/23245* (2013.01)

(58) Field of Classification Search
CPC  H04N 5/23296; G08B 13/1963; G03B 11/00; G03B 17/561; G03B 17/12
See application file for complete search history.

(56) References Cited

U.S. PATENT DOCUMENTS

2002/0067412 A1\* 6/2002 Kawai .................... H04N 5/232
  348/211.99
2002/0140814 A1\* 10/2002 Cohen-Solal ......... G01S 3/7865
  348/172

FOREIGN PATENT DOCUMENTS

| | | | |
|---|---|---|---|
| GB | 2368221 A | 4/2002 | |
| WO | 99/45422 A1 | 9/1999 | |
| WO | 99/45511 A1 | 9/1999 | |
| WO | WO 0201270 A2 \* | 1/2002 | ........... G02B 13/005 |
| WO | 2006/040687 A2 | 4/2006 | |
| WO | 2009/066988 A2 | 5/2009 | |
| WO | 2011/002775 A1 | 1/2011 | |
| WO | WO 2011002775 A1 \* | 1/2011 | ....... G08B 13/19604 |

OTHER PUBLICATIONS

CN Notification of the First Office Action, CN Application No. 2013 10097048.4, Feb. 14, 2017, 8 pages (English translation provided).

\* cited by examiner

METHOD FOR SWITCHING VIEWING MODES IN A CAMERA

CROSS REFERENCE TO RELATED APPLICATIONS

This application claims the benefit of U.S. Provisional Application No. 61/623,284 filed Apr. 12, 2012 and European Patent Application No. 12163178.2 filed Apr. 4, 2012, which are incorporated by reference as if fully set forth.

FIELD OF INVENTION

The present invention relates to monitoring cameras and in particular to methods for switching between various viewing modes of the camera.

BACKGROUND

Some monitoring cameras allow operation of the camera in different viewing modes. In order to switch between these modes specific keys on a keyboard or specific buttons on a control means are allocated for such operations. Using keys or buttons for switching viewing modes may result in some smaller problems such as a novice operator having trouble remembering which one of the keys or buttons that are performing the different operations. Hence it is of interest to provide an alternative and possibly more intuitive way of switching between different viewing modes.

SUMMARY

According to one embodiment, a method for switching operation of a monitoring system from a first monitoring mode to a second monitoring mode, comprises presenting an overview image when monitoring system is in first monitoring mode, receiving a direction signal from a control means when monitoring system is in first monitoring mode, directing a camera in an absolute direction indicated by the direction signal in accordance with a first camera control scheme, entering monitoring system into second monitoring mode in response to receiving the direction signal presenting a detailed image view captured by the camera when directed in the direction indicated by the direction signal, and moving, when in second monitoring mode, a camera head of the camera in response to control signals from the control means in accordance with a second control scheme.

The advantage of making the camera leaving the first monitoring mode presenting an overview image by movement of the control means in combination with moving the camera head to the absolute direction corresponding to the direction of the movement of the control means is that the operator does not have to memorize any keys or buttons for implementing this function.

According to another embodiment, the presented overview image and the presented detailed image view, respectively, are captured and presented as moving pictures.

According to yet another embodiment, the monitoring system includes an image sensor and wherein the act of capturing images to be presented is performed by the same image sensor independently of whether the monitoring system is in the first monitoring mode or in the second monitoring mode. One advantage of this embodiment is that the dual functionality may be achieved cost effectively, because we may use the same image sensor and the same image processing electronics.

In one embodiment, the monitoring system includes a camera base and a pan and tilt enabled camera head, wherein the overview image captured when the monitoring system is in the first monitoring mode is captured by means of the camera head through a wide angle lens that is fixedly arranged in relation to the camera base, and wherein the detailed image captured when the monitoring system is in the second monitoring mode is captured by means of the camera head not being directed through the wide angle lens. One advantage of this embodiment is that the image quality is improved, especially compared to wide angle cameras in which detailed views is calculated from a captured wide angle image. Moreover, this results in a compact system enabling good quality overview and detailed imagery.

In another embodiment, the method further comprises transforming information of the direction signal from the control means to an angular direction.

In yet another embodiment, the direction of the moving of the control means transforms to the corresponding angular direction in the overview image.

According to a further embodiment, the transforming of information of the direction signal from the control means to an angular direction includes transforming the signal to a controller angle corresponding to the direction of movement of the control means and adding an adjustment angle to the controller angle in order to compensate for any deviation in angular reference directions between the direction signal from the control means and pan angles of the camera.

According to one embodiment, the directing of the camera includes turning the camera to a pan angle corresponding to an angle indicated by the direction signal of the control means.

According to another embodiment, the directing of the camera further comprises turning the camera to a pre-set tilt angle.

A further scope of applicability of the present invention will become apparent from the detailed description given below. However, it should be understood that the detailed description and specific examples, while indicating embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the figures like reference characters designate like or corresponding parts throughout the several figures.

DETAILED DESCRIPTION OF THE PREFERRED EMBODIMENTS

The present invention relates to a monitoring system enabled to capture different image views when in different monitoring modes. These monitoring modes may for instance be a first mode being an overview mode and a second mode being a detailed mode. The overview mode may be a wide angle mode and the detailed mode may be a view having a narrower field of view. In order to implement these different monitoring modes, the monitoring system may, according to one embodiment, include two separate cameras or camera heads. However, according to another embodiment, the monitoring system includes one camera head, but is arranged to enable operate in the overview mode and detailed view, respectively.

Figure 1:
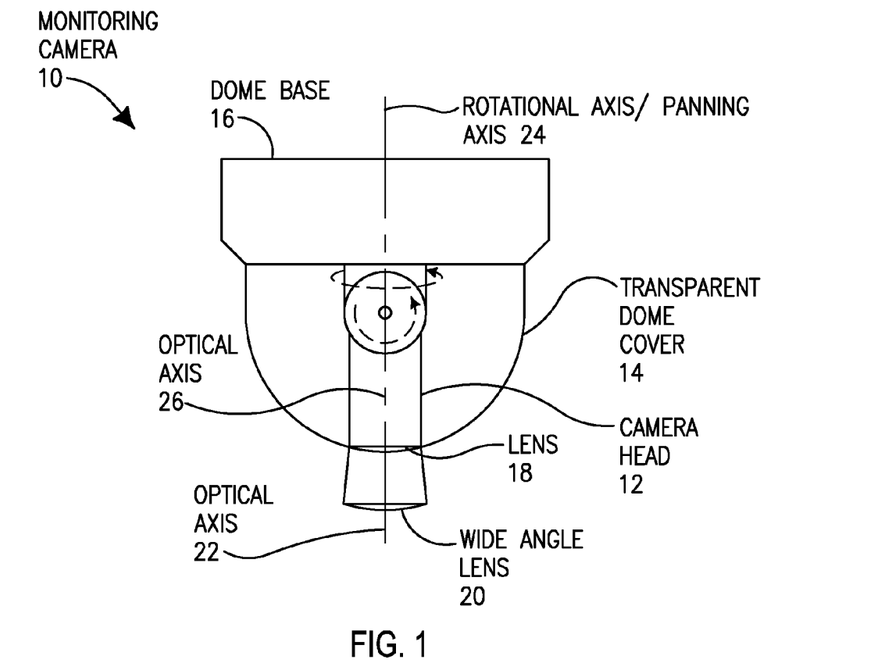
FIG. 1 is a schematic side view of a monitoring camera implementing one embodiment of the invention.

Referring to FIG. 1, according to one embodiment, the monitoring system is a monitoring camera 10, e.g., a dome camera, including a camera head 12, a transparent dome cover 14, and a dome base 16. The camera head 12 is enabled to pan and tilt by means of electronically controlled motors (not shown). The camera head 12 may be any known camera head that is enabled to pan and tilt. Further, the camera head 12 includes a lens 18. The lens 18 is arranged to focus light representing a scene to be captured by the camera 10 onto an image sensor in the camera head 12. The viewing angle of the captured image may be fixed or variable. Variable viewing angle may be accomplished by having a zoom enabled lens 18. In case of a fixed viewing angle lens, the selection of this fixed viewing angle may differ between different applications of the camera.

The dome camera further comprises a wide angle lens 20 mounted on the transparent dome cover 14 and extending from the dome cover 14 and away from the camera head 12. The wide angle lens 20 is mounted in a direction such that the optical axis 22 of the wide angle lens may substantially coincide with a rotational axis 24 around which the camera head 12 is turned during panning, hereinafter referred to as panning axis 24. The viewing angle of the wide angle lens 20 is wider than the viewing angle of the lens 18 in the camera head 12. In one embodiment, the viewing angle of the wide angle lens 20 is substantially wider than the viewing angle of the lens 18 of the camera head 12. The view angle of the wide angle lens may be more than 180 degrees. However, depending on the application the viewing angle may be less or more. The angle should at least be selected to provide a reasonable overview image.

Accordingly, the wide angle lens 20 is mounted so that the optical axis 26 of the camera head 12 may be aligned with the optical axis 22 of the wide angle lens 20 when the camera head 12 is directed for capturing an image through the wide angle lens 20.

Figure 2:
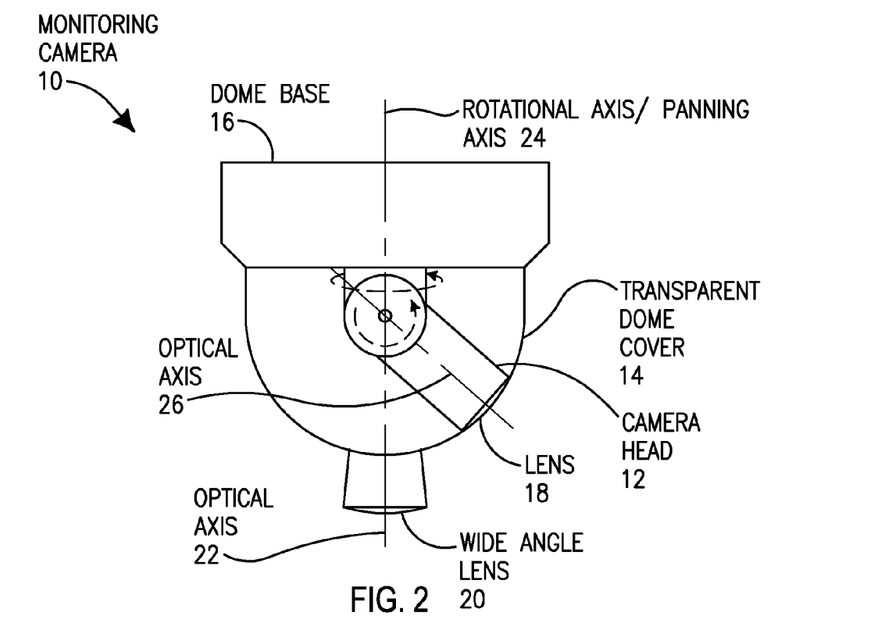
FIG. 2 is the same side view as in FIG. 1 with the difference that the camera head of the monitoring camera is tilted.

Due to the positioning of the wide angle lens 20 and the fact that the camera head 12 is moveable, it is possible to capture overview images through the wide angle lens 20 as depicted in FIG. 1 and when something interesting is spotted or detected in the overview image it is possible to investigate in more detail by simply moving the camera head 12 away from the wide angle lens 20 and directing it towards the interesting event or feature and capturing images through the dome cover. In FIG. 2, the camera is shown in a position for capturing the images through the dome cover in order to get a more detailed view and not through the wide angle lens 20.

In one embodiment, the viewing angle or the focal length of the lens 18 of the camera head 12 may be selected so that the images captured by the camera head 12, when not captured through the wide angle lens 20, is adequate for providing relevant surveillance information. Examples of relevant surveillance information may, for instance, be the registration number of a car, an identifiable face of a person, detailed progress of an event, etc. The viewing angle of the wide angle lens 20 may be selected so that the camera head 12 will capture an image view of at least the floor of an entire room in which the monitoring camera is installed when directed to capture images through the wide angle lens 20.

Alternatively, the viewing angle of the wide angle lens 20 may be selected so that the camera head 12 will capture an overview image of the monitored area when the camera head 12 is directed to capture images through the wide angle lens 20. Then an operator or an image analysis process may identify events or features of interest in the overview and redirect the camera head 12 for direct capture of the scene including the event or feature of interest. "Direct capture" in the above sentence should be understood as capturing an image by means of the camera head 12 when not directed to capture images through the wide angle lens 20.

Figure 3:
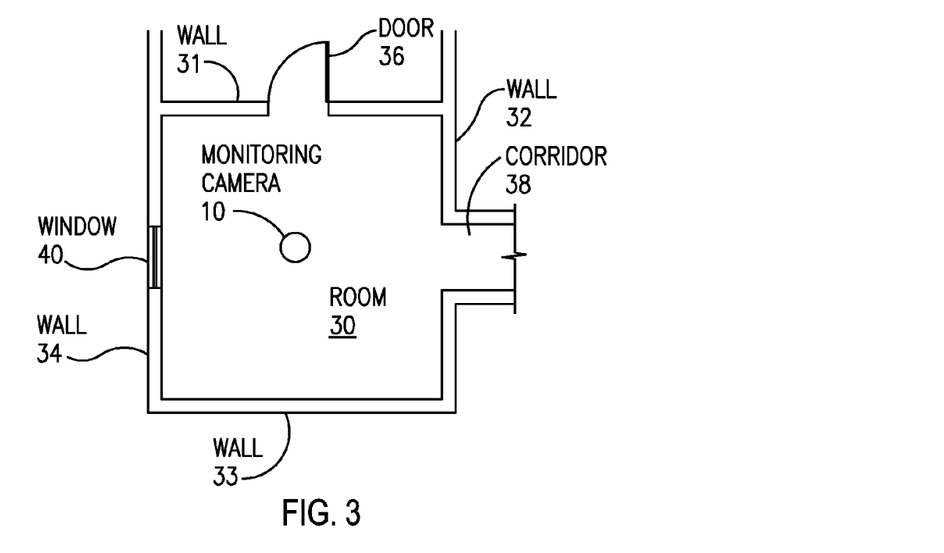
FIG. 3 is a schematic overview of an example room in which a monitoring camera according to one embodiment of the invention may be installed.
Figure 4:
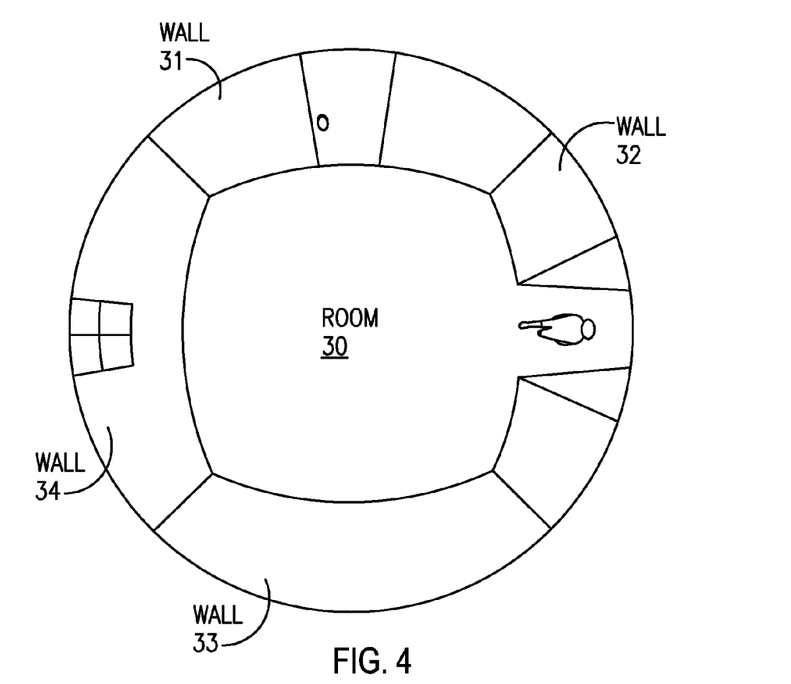
FIG. 4 is an example overview image from the monitoring camera in the example room of FIG. 3 capturing images through a wide angle lens as in FIG. 1.
Figure 5:
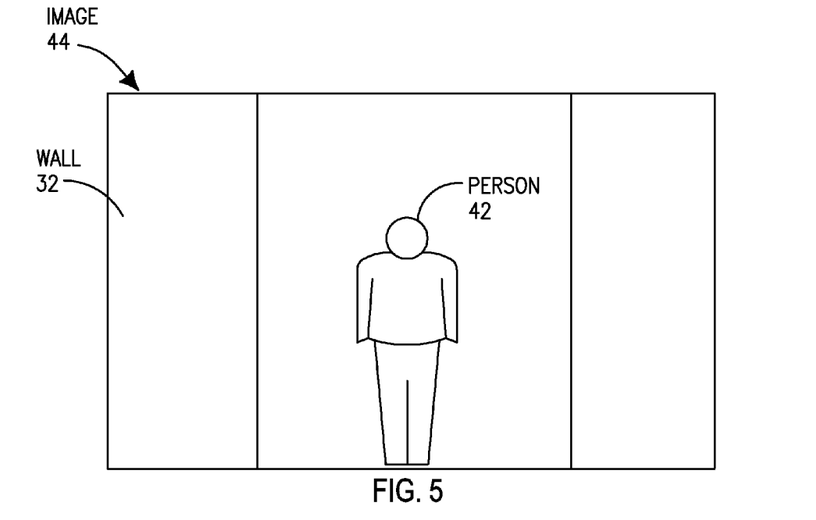
FIG. 5 is an example of a detailed view from the monitoring camera in example room of FIG. 3 capturing images through the dome glass as depicted in FIG. 2.

In order to facilitate the understanding of the function of the camera, an example scenario will be described below. In an example scenario, a monitoring camera 10 according to one embodiment is installed in the ceiling of a room 30, see FIG. 3. The room includes four walls 31-34, wherein wall 31 hold a door 36 for passage to an area next to the room, wall 32 present a passage into a corridor 38, and wall 34 hold a window 40. It may be assumed that the monitoring camera 10 is set in an overview mode, i.e., the camera head is capturing an overview image of the monitored area, by capturing images through the wide angle lens, the setting of the camera that is shown in FIG. 1. A frame from a video sequence from the monitoring camera 10 in overview mode may look like the image in FIG. 4 in which all four walls 31-34 of the monitored room 30 is captured by the overview camera view, i.e., the entire room 30 is captured by the monitoring camera when in overview mode. Moreover, the image frame reveals that a person 42 is entering the room. This is probably even more evident from a video sequence including the image frame. If an operator having access to the imagery of this monitoring camera 10, and having authority to control the monitoring camera 10, finds this person 42 interesting and would like to get a more detailed image of the person 42, then the operator may simply indicate the person 42 or the area of the person in the overview image at a control station and the camera head of the monitoring camera is directed away from the wide angle lens 20 and towards the indicated area of the monitored room 30. The directing of the camera head 12 away from the wide angle lens 20 may alternatively be initiated in response to a detected motion in the overview image, detected by means of a motion detection process. Hence, the camera head 12 will be moved into a position similar to the position shown in FIG. 2, and may capture an image 44 as the one presented in FIG. 5. The image captured by the camera head 12 may have a wider or narrower image view depending on the lens 18 on the camera head 12 and/or the zoom setting of this lens 18. When the operator has finished studying the person, the camera head 12 may be returned to capture images through the wide angle lens 20 and thereby be returned to the overview mode of the monitoring camera. Alternatively, if the directing of the camera head 12 away from the wide angle lens 20 was performed in response to motion detection in the overview image, then the camera head 12 may return to capturing images through the wide angle lens 20 in response to no motion being detected in the detailed view.

Figure 6:
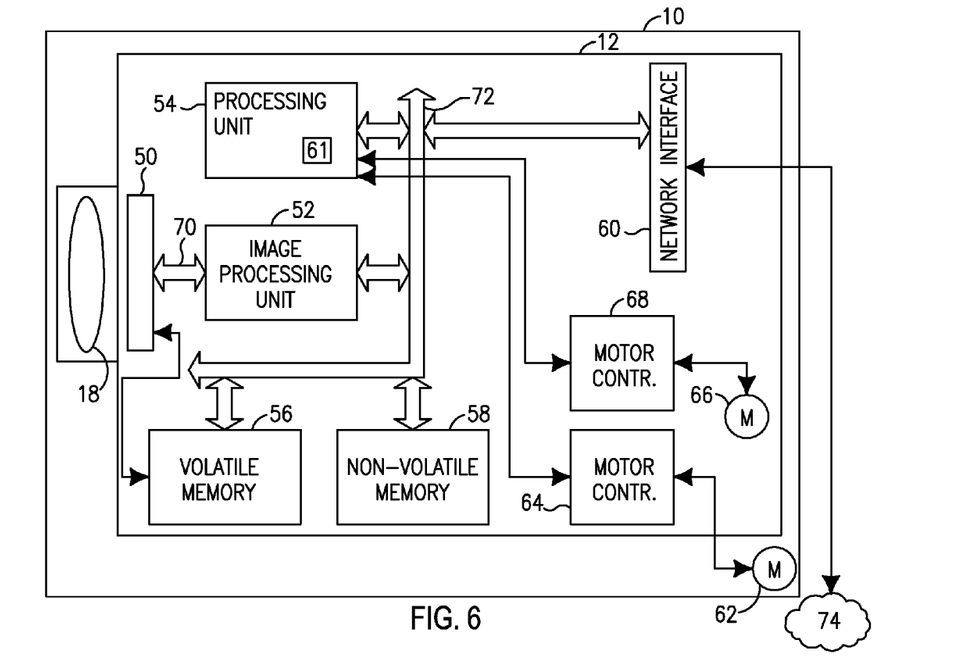
FIG. 6 is a schematic block diagram of a camera head according to one embodiment of the invention.

According to one embodiment, see FIG. 6, the monitoring camera 10 includes an image sensor 50, an image processing unit 52, a general processing unit 54, a volatile memory 56, a non-volatile memory 58, a network interface 60, a camera position controller 61, a panning motor 62, a panning motor controller 64, a tilting motor 66, and a tilting motor controller 68. Further means and devices required in a camera in order to perform normal camera functionality and normal network activities are not described herein as these means and devices are well known to the person skilled in the art.

The image sensor 50 may be any known image sensor able to capture light representing an image view and convert the light to electrical signals which then may be processed into digital images and or digital image streams by the image processing unit 52. Thus, the image sensor 50 may be arranged to capture visible light or infrared light, depending on the application of the camera. The image data from the image sensor 50 is sent to the image processing unit 52 via connection 70. The image processing unit 52 and the general processing unit 54 may be the same device, may be implemented as separate units on the same chip, or may be separate devices. Moreover, many functions described below as being performed in the image processing unit 52 may be performed in the general processing unit 54 and vice versa.

The processing units 52, 54 are connected to the volatile memory 56 for use as a work memory via for instance a bus 72. Moreover, the volatile memory 56 may be used as temporary data storage for image data during processing of the image data and the volatile memory 56 may therefore be connected to the image sensor 50 as well. The non-volatile memory 58 may store program code required for the processing units 52, 54 to operate and may store settings and parameters that is to be preserved for a longer time period and even withstand power outages. The processing units 52, 54 are connected to the non-volatile memory 58 via, for instance, the bus 72.

The network interface 60 includes an electrical interface to the network 74, to which the monitoring camera may be connected. Further, the network interface 60 also includes all logic interface parts that are not implemented as being executed by the processing unit 54. The network 74 may be any known type of LAN (Local Area Network), WAN (Wide Area Network), or the Internet. The person skilled in the art is well aware of how to implement a network interface using any of a plurality of known implementations and protocols.

The panning motor 62 and the tilting motor 66 may be controlled by the processing 54 unit via each motor controller 64, 68. The motor controllers are arranged to convert instructions from the camera position controller 61 into electrical signals compatible with the motors. The camera position controller 61 may be implemented by means of code stored in memory 58 or by logical circuitry. The tilt motor 66 may be arranged within or very close to a panable/tiltable camera head 12 and the pan motor 62 are in many cases arranged further away from the camera head 12, in particular in the cases where the joint for panning is the second joint, counted from the camera head 12. Control messages for pan and tilt may be received via the network 74 and processed by the processing unit 54 before forwarded to the motor controllers 64, 68.

Other implementations of the monitoring camera 10 are evident to the person skilled in the art.

Figure 7:
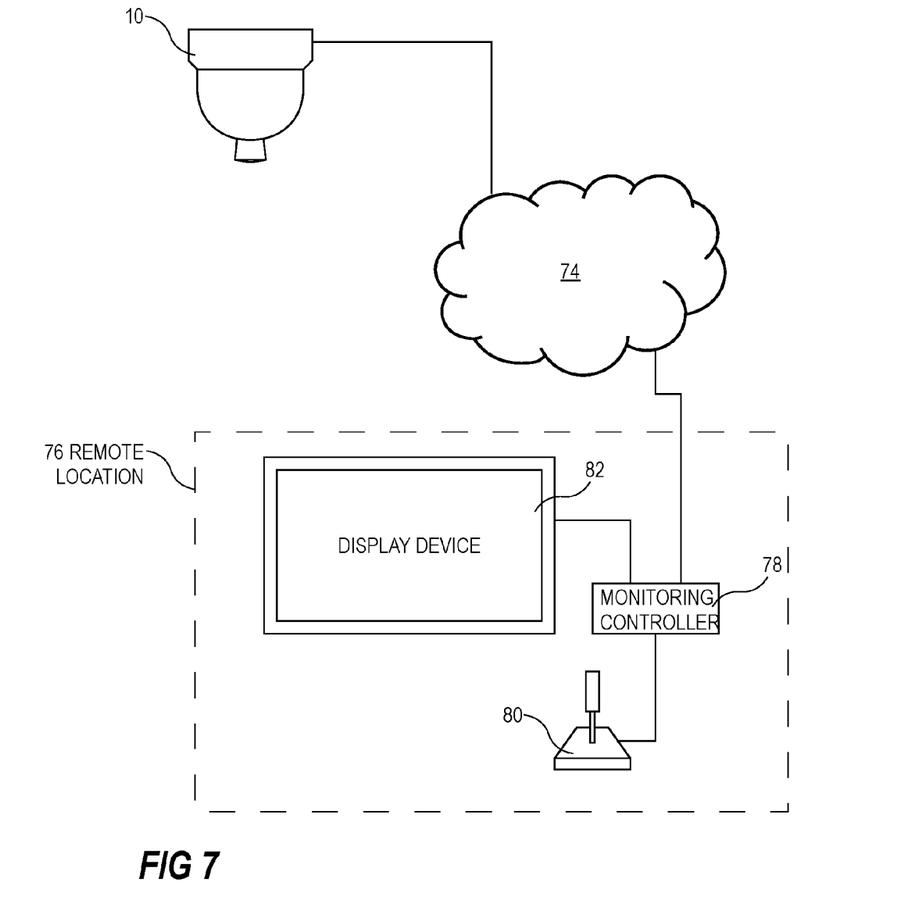
FIG. 7 is a schematic overview of a system in which a method according to the present invention may be implemented.

Now referring to FIG. 7, the monitoring camera 10 may be remotely operated from a surveillance center, from a simple computer setup including a personal computer, a work station, or similar equipment, from a telephone or any other small handset. By being "remotely operated", the monitoring camera 10 may be operated from a remote location 76 at any distance from the monitoring camera 10, e.g., being operated from a room next to the monitoring camera 10 or from another country. In the embodiment shown in FIG. 7, the monitoring camera 10 is connected to a monitoring controller 78 arranged at a remote location 76. The monitoring camera 10 and the monitoring controller 78 are connected to each other via the network 74, described above.

Further, the monitoring camera 10 may be remotely operated using a control means 80, e.g., a joy stick, a track ball, a mouse, a touch pad, etc., connected to the monitoring controller 78 and the imagery from the monitoring camera 10 may be viewed on a display device 82, e.g., a monitor, a display on a handheld device etc. The monitoring controller 78 may be any computer device arranged to connect to a monitoring camera 10 over the network 74, to provide monitoring images to the display device 82, and to receive control signals from the control means 80.

Figure 8:
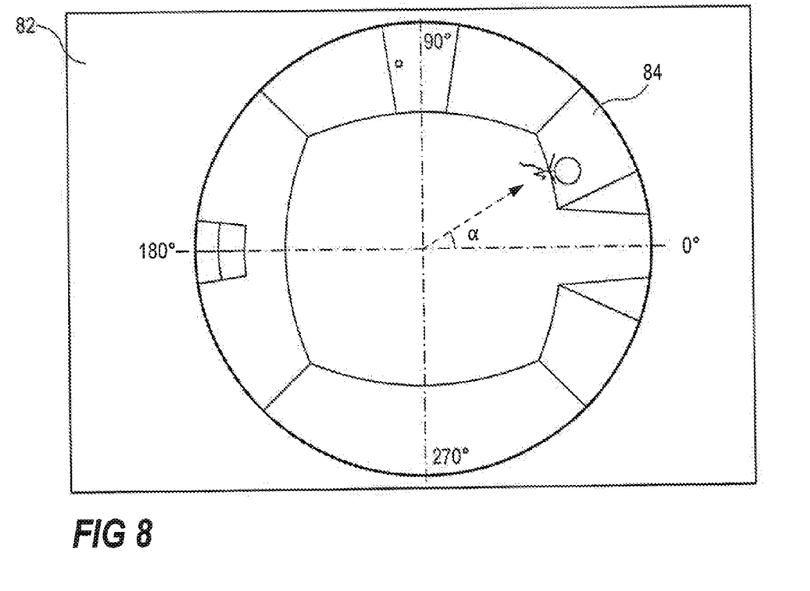
FIG. 8 is a schematic view of a display unit presenting an overview image.

Now referring to FIG. 8, in a situation in which the operator is presented with a live overview image 84, i.e., a real time moving picture continuously captured by the camera head 12 through the wide angle lens 20, on the display device 82 the operator may be interested in leaving the overview in order to manoeuvre the camera 10 in detailed mode due to something he observes in the overview image 84 or in order to take a closer look at something. In the context of the embodiments described herein, the term "moving picture" may be an image view represented by frequently updated images presented in a temporal order with moving objects shown in successive positions slightly changed so as to produce the optical effect of a continuous picture in which the moving objects move. Today such switching between viewing a live overview image 84 in overview mode and viewing details of a scene in a detailed mode is generally performed by pressing a key or pushing a button. The directional control means 80 used today are implementing normal pan tilt control functions. This normal control function transforms right and left movement of the control means 80 to right and left panning of the camera head 12 and it transforms forward and back movement of the control means 80 to up and down tilting. This normal control function is used independently of whether the monitoring system is in overview mode or in detailed mode.

Figure 9:
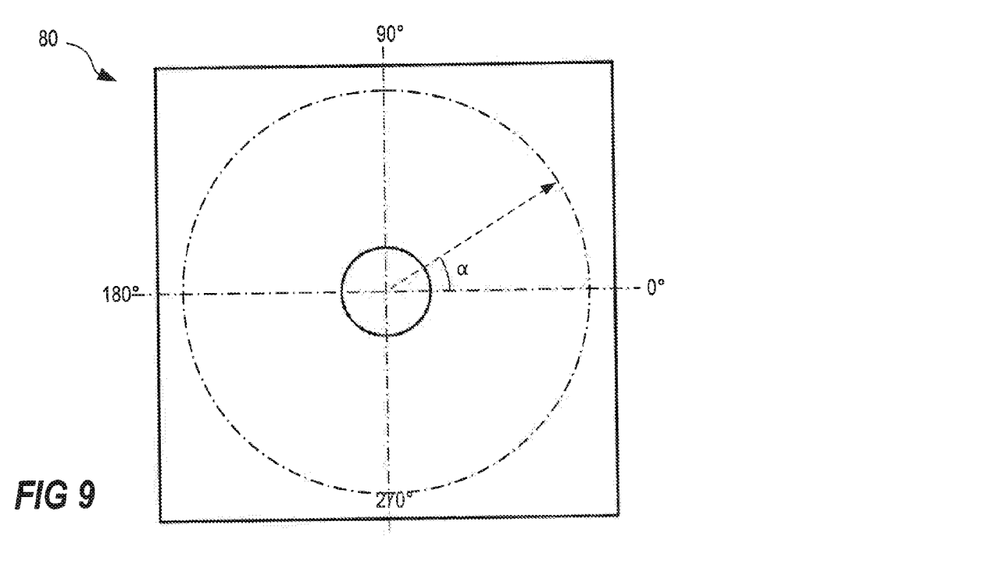
FIG. 9 is a schematic top view of a joystick and the relation between moving directions of the joystick and a polar coordinate system.

According to one embodiment, when in overview mode the system may be arranged to respond to a control means 80 movement, which may be translated to a direction by exiting the overview mode and directing the monitoring camera 10 in an absolute direction corresponding to the direction of the movement of the control means 80. For example, if polar coordinate systems are applied to the overview image and to a plane of movement for the control means 80, represented by a top view of a joystick in FIG. 9, then the absolute direction having the angle α in the overview image of FIG. 8 corresponds to the moving angle α of the joystick in FIG. 9. The polar coordinate systems are shown in FIGS. 8 and 9 in which the dash dotted lines represents 0, 90, 180, and 270 degrees, in the polar coordinate system.

The direction angle α may then be sent in a pan command to the monitoring camera 10 in order to make the monitoring camera 10 pan into the requested direction, i.e., to the requested pan angle Ψ. This works if the polar coordinate systems of the overview 84 and the control means 80 corresponds to the same angles in a pan control system controlling the panning of the monitoring camera 10, i.e., if the corridor of the overview corresponds to pan angle 0°, the door corresponds to pan angle 90°, and the window corresponds to pan angle 180°. If the coordinate systems of the overview 84 and the control means 80 do not correspond to the same angles in a pan control system controlling the panning of the monitoring camera 10, then a correction constant ϵ may be applied to a transfer function generating the pan angle corresponding to a specified direction in the overview image. Such a transfer function $f_{trans}$ trans may be written as:

$$\Psi = f_{trans}(\alpha) = \alpha + \epsilon$$

The tilt angle of the camera head 12 may be set to a predetermined tilt angle $\phi_{pre}$. This predetermined tilt angle $\phi_{pre}$ may be selected for providing as much environmental information as possible from the position of the selected pan angle Ψ.

In one embodiment the predetermined tilt angle $\phi_{pre}$ is set to an angle that is close to the edge of the wide angle lens 20, without having any part of the wide angle lens 20 obscuring the image view captured by the camera head 12. One advantage of this embodiment is that the camera head 12 does not have to tilt very far and, thus, the time it takes to arrive at the correct tilt angle $\phi_{pre}$ is short. Another advantage is the operator knowing to tilt the camera 10 in one specific direction if the desired camera view is not captured initially. According to another embodiment, the predetermined tilt angle $\phi_{pre}$ is 45 degrees.

Now when the monitoring camera 10 has entered the detailed mode for capturing detailed images the control function transforming control means 80 movements to movement of the camera head 12 is switched to the normal pan tilt control function mentioned above. This control function does not make any sense for an operator when the camera is in overview mode as a right/left movement of the control means then only will make the overview image spin around. Accordingly, the monitoring camera 10 is moving according to an overview mode control scheme when in overview mode and according to a detailed mode control scheme.

Figure 10:
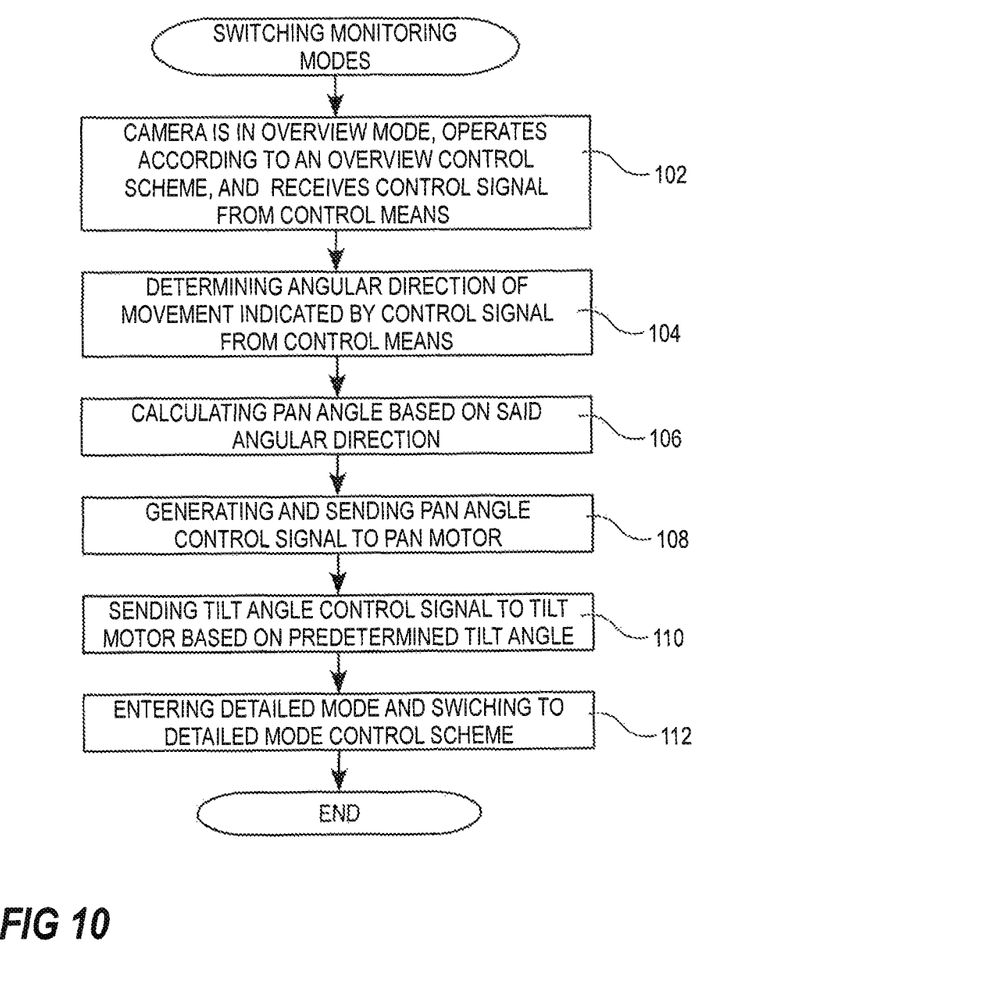
FIG. 10 is a flowchart of a switching process according to one embodiment of the invention.

In FIG. 10, a flowchart describes a method, according to one embodiment of the invention, for switching from the overview mode to the detailed mode. The process described below is performed in the monitoring camera 10. One specific advantage of performing the process in the monitoring camera 10 is that a camera implementing this method will be compatible with existing monitoring software because the same control signals as for existing systems may be sent to the camera. Hence, the monitoring software and the rest of the monitoring system do not need to know that the monitoring camera 10 operates differently. However, it is possible to perform the process in a device separate from the monitoring camera 10 and transmit only control instructions to the monitoring camera 10.

This process starts when the monitoring camera 10 is in overview mode and its movements is controlled in accordance with an overview control scheme and in order to start the switching process a control signal including an indication of the direction of the movement of a control means 80 is received, step 102. The angular direction of the movement of the control means 80 is determined from the control signal received from the control means 80, step 104. Then a pan angle Ψ is calculated based on the angular direction, step 106. A control signal representing the resulting pan angle Ψ is sent to a panning motor 62 for turning the camera head 12 to the calculated pan angle Ψ, step 108. A control signal representing a predetermined tilt angle $\phi_{pre}$ is sent to a tilting motor 66, step 110. The monitoring camera 10 is switched from overview mode to detailed mode and the camera movement control scheme is changed to a detailed mode control scheme, step 112, in which right movement of control means 80 translates to clockwise panning of camera head, left movement of control means translates to counter clockwise panning of camera head 12, forward movement of control means 80 translates to upwards, in relation to the image presented on the display device, tilting of camera head 12, and downward movement of control means 80 translates to downwards, in relation to the image presented on the display device, tilting of camera head 12.

The method according to the invention may be implemented as a program code that is stored in a memory 56, 58, processed by a processor 54. The memory 56, 58, and processor 54 may be a processor and a memory of the monitoring camera 10 itself, of the monitoring controller 78, or any other computing device of a monitoring system. However, it will be understood that instead of implementing the method using program code, the method may be implemented by a purpose designed hard coded or hard wired system.

What is claimed is:

1. A method for switching a monitoring camera, including a camera head, from a first monitoring mode to a second monitoring mode, comprising:
  presenting an overview image captured by the camera when the monitoring camera is in first monitoring mode,
  receiving a direction signal from a control means when the monitoring camera is in first monitoring mode,
  directing the camera head in an absolute direction indicated by the direction signal in accordance with a first camera control scheme related to the first monitoring mode,
  entering the monitoring camera into second monitoring mode in response to receiving the direction signal,
  presenting, when monitoring system is in the second monitoring mode, a detailed image view captured by the camera head when directed in the direction indicated by the direction signal, wherein the detailed image view is a zoomed in view of a point of interest in the overview image, and moving, when in second monitoring mode, the camera head of the monitoring camera in response to direction signals from the control means in accordance with a second control scheme related to the second monitoring mode, wherein the first camera control scheme and the second camera control scheme behave differently in response to the control means.

2. The method according to claim 1, wherein the presented overview image and the presented detailed image view, respectively, are captured and presented as moving pictures.

3. The method according to claim 1, wherein the monitoring camera includes an image sensor and wherein the act of capturing images to be presented is performed by the same image sensor independently of whether the monitoring system is in the first monitoring mode or in the second monitoring mode.

4. The method according to claim 1, wherein the monitoring camera includes a camera base, wherein the camera head is a pan and tilt enabled camera head, wherein the overview image captured when the monitoring system is in the first monitoring mode is captured by means of the camera head through a wide angle lens that is fixedly arranged in relation to the camera base, and wherein the detailed image captured when the monitoring system is in the second monitoring mode is captured by means of the camera head not being directed through the wide angle lens.

5. The method according to claim 1, further comprising transforming information of the direction signal from the control means to an angular direction.

6. The method according to claim 5, wherein the direction of the moving of the control means transforms to the corresponding angular direction in the overview image.

7. The method according to claim 5, wherein the transforming of information of the direction signal from the control means to an angular direction includes transforming the signal to a controller angle corresponding to the direction of movement of the control means and adding an adjustment angle to the controller angle in order to compensate for any deviation in angular reference directions between the direction signal from the control means and pan angles of the camera.

8. The method according to claim 1, wherein the directing of the camera includes turning the camera head to a pan angle corresponding to an angle indicated by the direction signal of the control means.

9. The method according to claim 8, wherein the directing of the camera further comprises turning the camera head to a pre-set tilt angle.

* * * * *